(12) United States Patent
Zakula, Sr. et al.

(10) Patent No.: US 6,206,127 B1
(45) Date of Patent: Mar. 27, 2001

(54) LEAD WHEEL STEERING SYSTEM FOR A GANTRY CRANE

(75) Inventors: Daniel Brian Zakula, Sr., Mokena; Myron Glickman, Arlington Heights, both of IL (US); David A. Eckerd, Bethlehem, PA (US)

(73) Assignee: Mi-Jack Products, Hazal Crest, IL (US)

( * ) Notice: Subject to any disclaimer, the term of this patent is extended or adjusted under 35 U.S.C. 154(b) by 0 days.

(21) Appl. No.: 09/032,536

(22) Filed: Feb. 27, 1998

(51) Int. Cl.$^7$ .................................................. B60K 23/08
(52) U.S. Cl. ......................... 180/236; 180/253; 180/234; 180/411
(58) Field of Search .................... 180/411, 408, 180/253, 234, 242, 308

(56) References Cited

U.S. PATENT DOCUMENTS

| | | | |
|---|---|---|---|
| 3,645,406 | * | 2/1972 | Brazell .................................. 212/14 |
| 3,680,653 | | 8/1972 | Murata et al. . |
| 3,696,881 | | 10/1972 | Gordon . |
| 3,825,087 | * | 7/1974 | Wilson ................................ 180/6.48 |
| 3,933,218 | | 1/1976 | Oler et al. . |
| 3,972,379 | * | 8/1976 | Norris .................................... 180/46 |
| 3,973,754 | | 8/1976 | Chadwick, Jr. . |
| 4,003,447 | * | 1/1977 | Weyer ................................... 180/140 |
| 4,090,581 | * | 5/1978 | Miner et al. .......................... 180/140 |
| 4,200,162 | | 4/1980 | Tax . |
| 4,263,979 | | 4/1981 | Sturgill . |
| 4,284,159 | | 8/1981 | Voela . |
| 4,372,725 | * | 2/1983 | Moore et al. ......................... 414/460 |
| 4,444,287 | | 4/1984 | Voelz . |
| 4,457,389 | | 7/1984 | Voelz . |
| 4,498,554 | * | 2/1985 | Young et al. ......................... 180/236 |
| 4,544,070 | | 10/1985 | Sickler . |
| 4,728,923 | * | 3/1988 | Finger ................................ 340/52 R |
| 4,823,899 | | 4/1989 | Ron . |
| 4,893,689 | * | 1/1990 | Laurich-Trost ...................... 180/140 |
| 4,995,472 | * | 2/1991 | Hayashi et al. ...................... 180/234 |
| 4,995,774 | * | 2/1991 | Nusbaum ............................. 414/544 |
| 5,156,282 | | 10/1992 | Thorsen . |
| 5,180,070 | | 1/1993 | Feider . |
| 5,213,143 | * | 5/1993 | Policky et al. .......................... 141/71 |
| 5,265,021 | * | 11/1993 | Avitan ............................. 364/424.05 |
| 5,325,935 | * | 7/1994 | Hirooka et al. ...................... 180/211 |
| 5,609,220 | * | 3/1997 | Moriya et al. ........................ 180/253 |
| 5,752,578 | | 5/1998 | Kellogg . |

FOREIGN PATENT DOCUMENTS 1 481 777 * 3/1969 (DE) .

OTHER PUBLICATIONS

*Drott® Product Bulletin, Drott® Travelifts* (1979).

* cited by examiner

Primary Examiner—Brian L. Johnson
Assistant Examiner—Daniel Yeagley
(74) Attorney, Agent, or Firm—Leydig, Voit & Mayer, Ltd

(57) ABSTRACT

A steering apparatus and method are provided for a gantry crane with four corner-mounted wheel assemblies having steerable wheels. The crane is a type which drivable in either longitudinal or transverse directions, wherein steering control is automatically switched steering control to the "leading" wheels, or more particularly the wheels of the "leading" pair of wheel assemblies. The system detects which two of the wheel assemblies are leading, whether the crane is moving longitudinally frontwardly or rearwardly, or transversly rightward or leftward. The system includes a steering controller which controls steering actuators in such a manner that the wheels of the then-leading wheel assemblies are moved according to steering control input, while the wheels of a remaining pair of then-"trailing" wheel assemblies are moved to and/or held in, a straight alignment.

10 Claims, 7 Drawing Sheets

LEAD WHEEL STEERING SYSTEM FOR A GANTRY CRANE

BACKGROUND OF THE INVENTION

The present invention generally relates to a directional control system for a gantry type crane which is drivable in longitudinal and transverse directions. More specifically, the invention relates to a steering control system which enhances steering control by automatically switching steering control to a "leading" pair of wheels.

Mobile gantry cranes are generally known for lifting, loading, and moving heavy loads and containers. Such cranes are commonly used at shipping yards, railyards, construction sites, etc. A gantry crane typically has four corner-mounted wheels.

So that a gantry crane can be desirably maneuvered and positioned over an object to be lifted, at least one pair of wheels of the crane is typically steerable. Transverse movement has been found to be desirable under certain lifting circumstances, and therefore, cranes are known in which all four wheels may be turned in a transverse direction for side-to-side movement. For example, U.S. Pat. No. 5,180,070 discloses a crane in which all four wheels may be turned in a transverse direction.

SUMMARY OF THE INVENTION

An object of the present invention is to provide a steering system which enhances the maneuverability of a gantry crane.

The present invention achieves this and other objects by providing a steering system for a gantry crane which automatically switches steering control to the wheels of a "leading" pair of wheel assemblies, whether the crane is moving longitudinally frontwardly or rearwardly, or transversly right or left. More particularly, the system detects which pair of wheel assemblies are "leading" and sends steering control signals to the wheels of that that leading pair of wheel assemblies.

The system continues to deliver steering input signals from the operator controls only to the leading wheels until the leading direction of the crane is altered. For example, the system determines that a respectively different pair of wheels are "leading" when the operator reverses the drive direction or switches the general crane wheel alignment between longitudinal and transverse modes. The wheels of the pair of non-leading wheel assemblies are turned to, or held in, an appropriate straight alignment, as appropriate.

An advantage of the present invention is that it provides a steering system for a gantry type crane that enhances maneuverability.

Another advantage of the present invention is that it provides a steering system which automatically determines which pair of wheel assemblies are leading, and the system delivers steering motion control signals to the wheels of the then-leading wheel assemblies.

Additional features and advantages of the present invention are described in, and will be apparent from, the description of the invention herein, the claims, and the drawings.

DETAILED DESCRIPTION OF THE DRAWINGS

Figure 1:
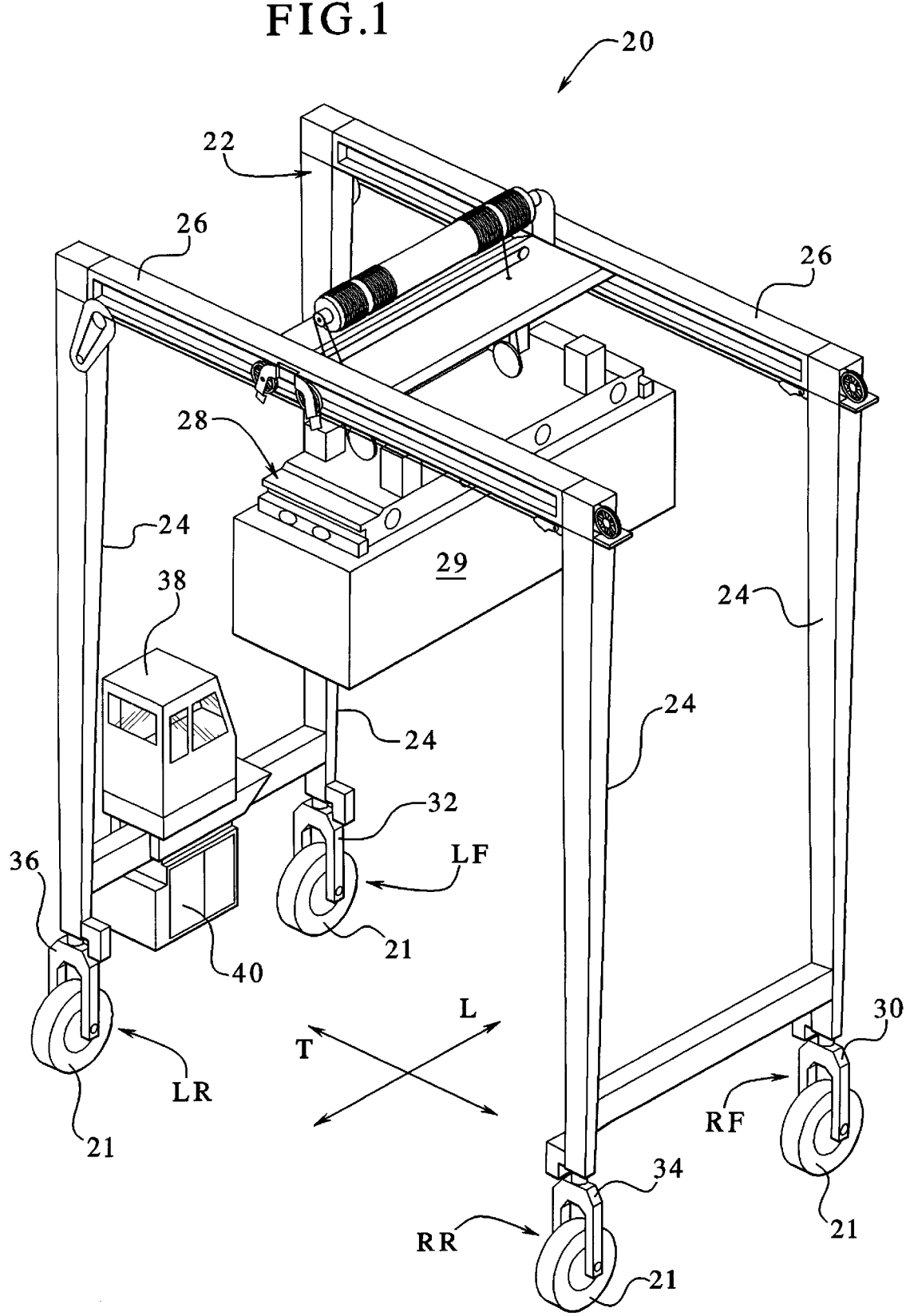
FIG. 1 is a perspective view of a crane constructed and controlled in accordance with the present invention.

Now turning to the Figures, wherein like numerals designate like components, FIG. 1 illustrates a gantry crane 20 having a frame 22 with four vertical columns 24. Across the vertical columns, the frame 22 includes horizontal support beams 26 which support a vertically movable grappler 28. The grappler is adapted to engage, lift and handle loads, such as a container 29, in an appropriate manner. Generally at the corners of the crane 20, the crane 20 includes four wheel assemblies, each including at least one rollable wheel 21 on which the crane is drivable: a right front wheel assembly RF, a left front wheel assembly LF, a right rear wheel assembly RR, and a left rear wheel assembly LR. More specifically, each of the wheel assemblies RF, LF, RR, LR includes at least one wheel 21 are rotatably mounted a respective yoke 30, 32, 34, 36 which is mounted to the frame 22 in a steerably pivotable manner. The yokes 30, 32, 34, 36 are generally mounted at four corners of the crane 20. These wheels RF, LF, RR, LR are arranged in a generally quadrilateral fashion.

In the particular embodiment illustrated, the wheels of the rear wheel assemblies RR, LR are drivably coupled to hydraulic motors mounted on the yokes 30, 32, 34, 36 in a known manner, and the wheels 21 of the front wheel assemblies RF, LF are nonpowered. However, other embodiments are possible wherein the wheels 21 of the front wheel assemblies RF, LF may be powered in addition to, or alternatively to, the wheels of the rear wheel assemblies RR, LR.

Figure 2:
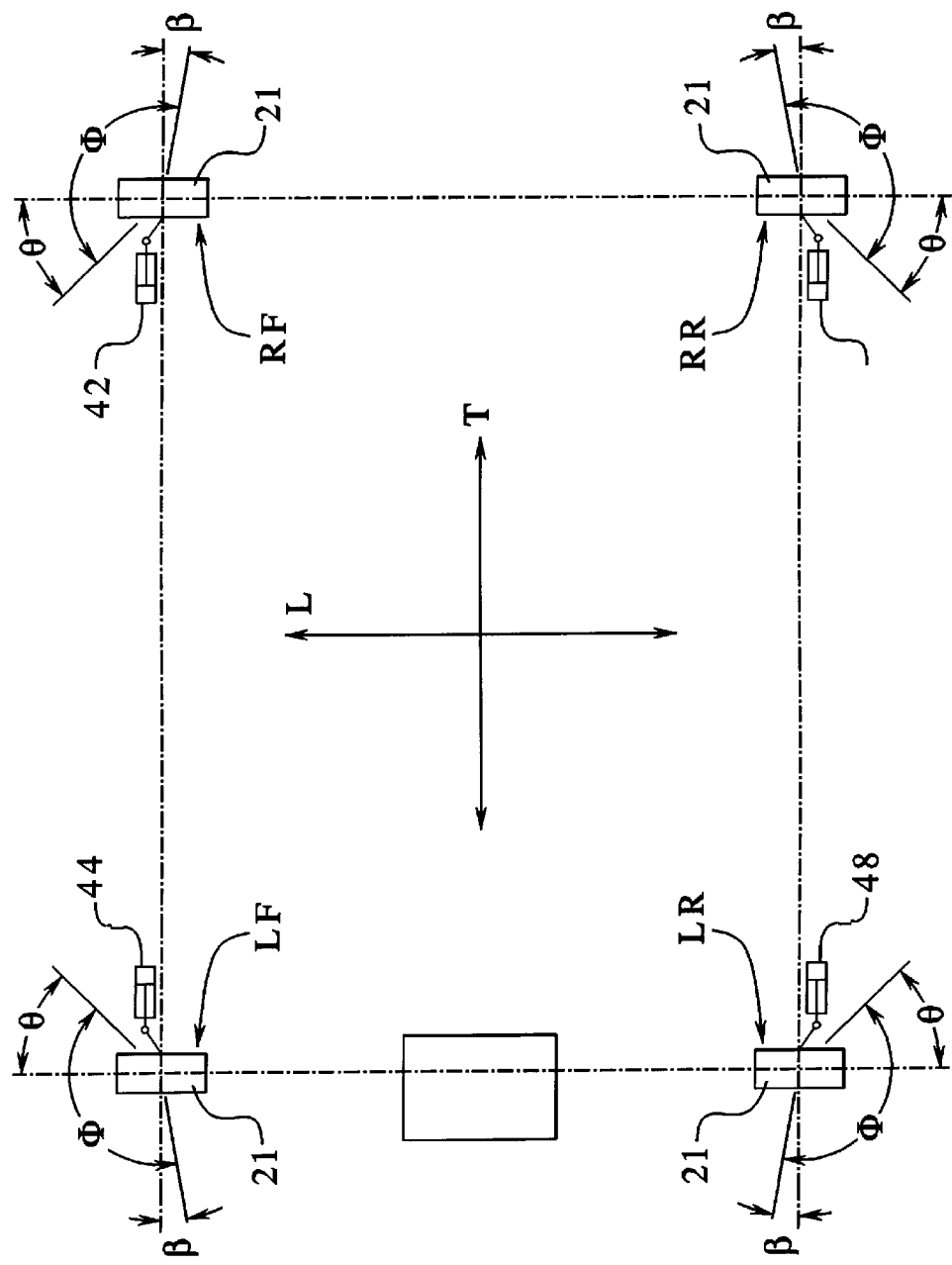
FIG. 2 is a schematic plan view illustrating wheel steering angle ranges achievable on the crane.
Figure 3:
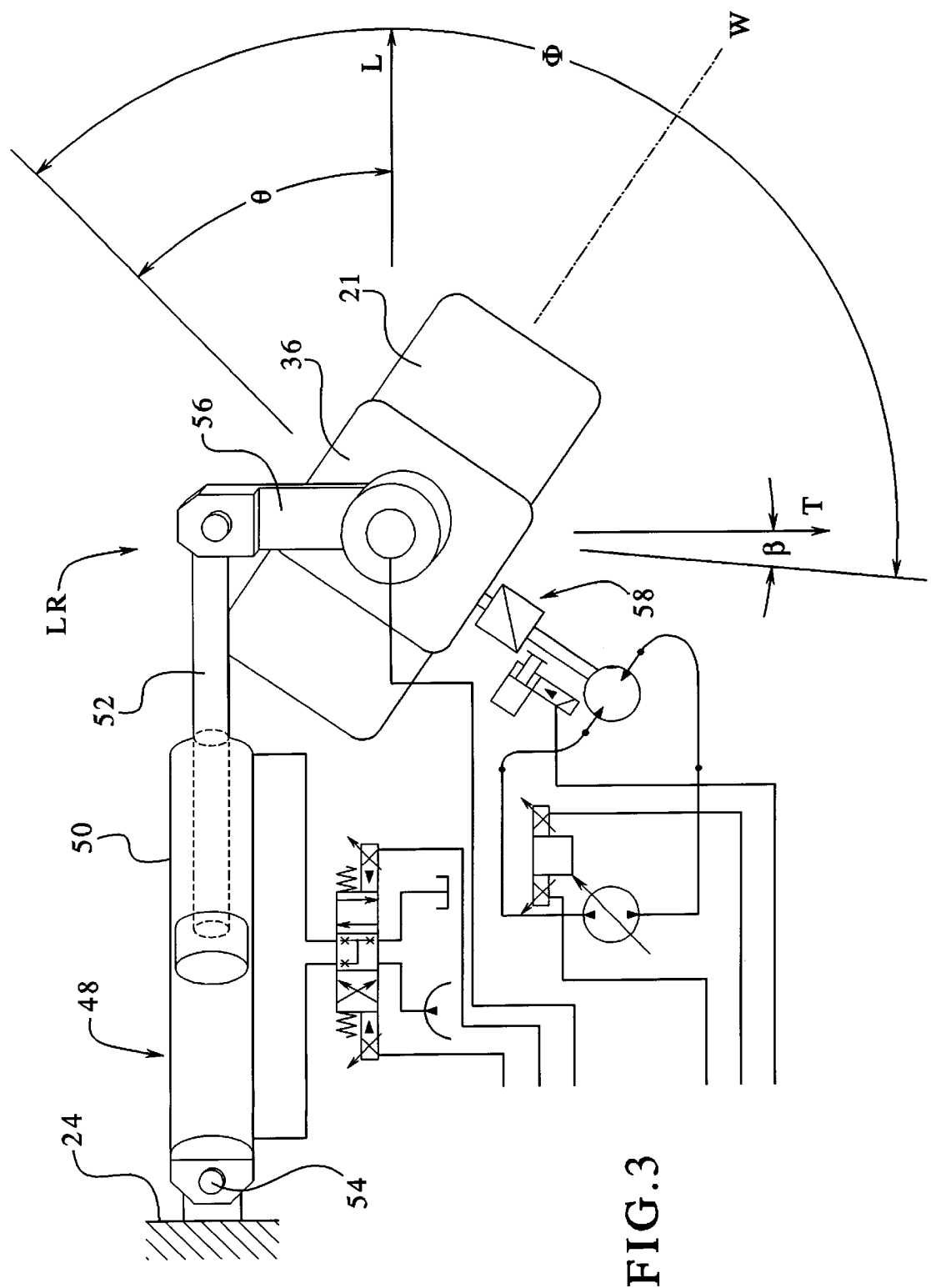
FIG. 3 is a schematic plan view of a wheel assembly having a steering actuator assembly operable to rotate a wheel yoke.

Although the wheel assemblies illustrated FIGS. 1–3 each include a single wheel 21, it should be understood that embodiments of the invention are possible with a crane 20 including more than four actual wheels. In particular, cranes are known wherein at least one of the crane's four corners is supported by a wheel assembly which includes multiple wheels, as discussed below in greater detail in connection with FIG. 11. Such a multiple-wheel wheel assembly is generally located at, and supports, a corner of the crane. The multiple wheels of a particular wheel assembly are cooperatively steerable, and accordingly, a wheel assembly having multiple wheels operates as a wheel assembly RF, LF, RR, and LR according to the description of FIGS. 1–10. It is intended that such multiple-wheel wheel assemblies be encompassed by the claims of the present invention.

Still referring to FIG. 1, the crane 20 includes a cab 38 mounted to the frame 22 for accommodating an operator. The cab 38 contains controls for steering, driving, and maneuvering the crane. The operator can drive and steer the crane 20 as desired over an object to be lifted by the grappler 28. The controls are discussed in greater detail below. The crane 20 also includes a power unit 40 having an internal combustion engine driving a hydraulic pump (discussed below). The cab 38 may mounted to the frame 22 at any suitable position, as the functionality and advantages of the invention are not limited by the location of the cab 38.

The crane 20 can be selectively maneuvered in a longitudinal mode for operational movement along a longitudinal axis L, or in a transverse mode for operational movement along a transverse axis T. Accordingly, the crane 20 is a type in which each of the yokes 30, 32, 34, 36 may be swivelled to align the wheels 21 of the respective wheel assemblies RF, LF, RR, LR rollably along either the longitudinal axis L or the transverse axis T.

Referring to FIG. 2, the crane 20 has a steering system which includes four steering actuators 42, 44, 46, 48, each being operable to actuate steering movement of the wheels of a respective one of the wheel assemblies RF, LF, RR, LR. With the steering actuators 42, 44, 46, 48, the respective yokes 30, 32, 34, 36 are pivotable on vertical axes through an angular range of steering motion, indicated by the angle Φ sufficient that the respective wheels RF, LF, RR, LR can be pivoted between the alignment on the longitudinal axis L and the transverse axis T, as well as permitting pivotal steering movement in the angular ranges Θ and β, as appropriate, when in either the longitudinal or transverse modes, respectively, as described below.

Turning to FIG. 3, the actuator 48 is illustrated in greater detail. The actuator 48 of FIG. 3 is exemplary, and it should be understood that an appropriate similar structure is suitable for the other actuators 42, 44, and 46 as well. It should also be understood that any or all of the steering actuators 42, 44, 46, and 48 may be of a type different than that shown in FIG. 3 (e.g., a piston-cylinder linkage different than that shown, or a rotational motor coupled to move the yoke with an appropriate gear drive or chain/sprocket drive), so long as each of the wheels 21 of the wheel assemblies RF, LF, RR, LR is steerably pivotable through the suitable range of angular range Φ.

As illustrated in FIG. 3, the steering actuator 48 includes a cylinder 50 and an extendible piston rod 52. In an exemplary embodiment, the cylinder 50 has a five inch bore, a three inch rod, and a 37 ½ inch stroke. The cylinder 50 is mounted to the column 24, or other suitable position on the frame 22, by a pivotable joint 54 (FIG. 1), and an end of the piston rod 52 is coupled to the yoke 30 by a link 56 or some other suitable structure. FIG. 3 also illustrates the hydraulic motor 58 mounted to the yoke 36 and coupled to rotatably drive the wheel of the wheel assembly LR.

Extension or retraction of the piston rod 52 within the cylinder 50 causes a corresponding pivoting of the yoke 36 and the associated wheel of the wheel assembly LR. In particular, the yoke 36 can be turned to align a rolling axis W of the wheel LR parallel to the longitudinal axis L for longitudinal travel of the crane 20, and the yoke 36 can be turned to align a rolling axis W of the wheel 21 parallel to the transverse axis T for transverse travel of the crane. Within the steering range Φ, the actuator 42 is also capable of pivoting the rolling axis W of the wheel LR beyond the axes L and T as indicated by the angles Θ and β for appropriate steering control in accordance with various lead-wheel steering travel modes of the crane 20, as explained below in connection with FIGS. 4–7.

Figure 4:
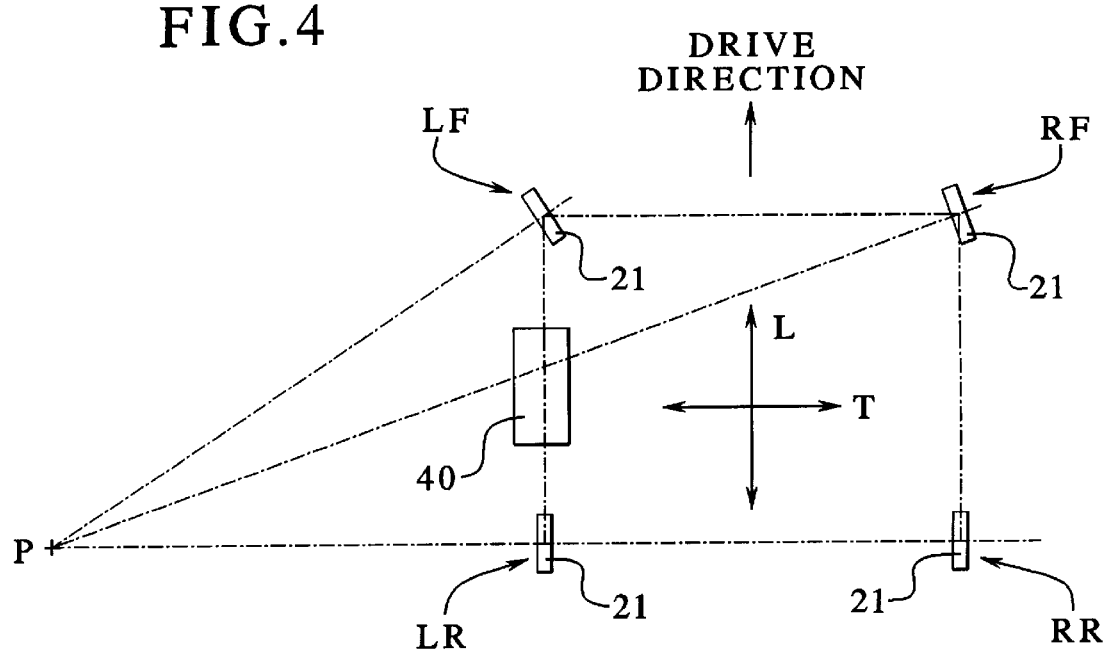
FIG. 4 is a schematic plan view of the wheels of the crane in a forward longitudinal driving mode.
Figure 5:
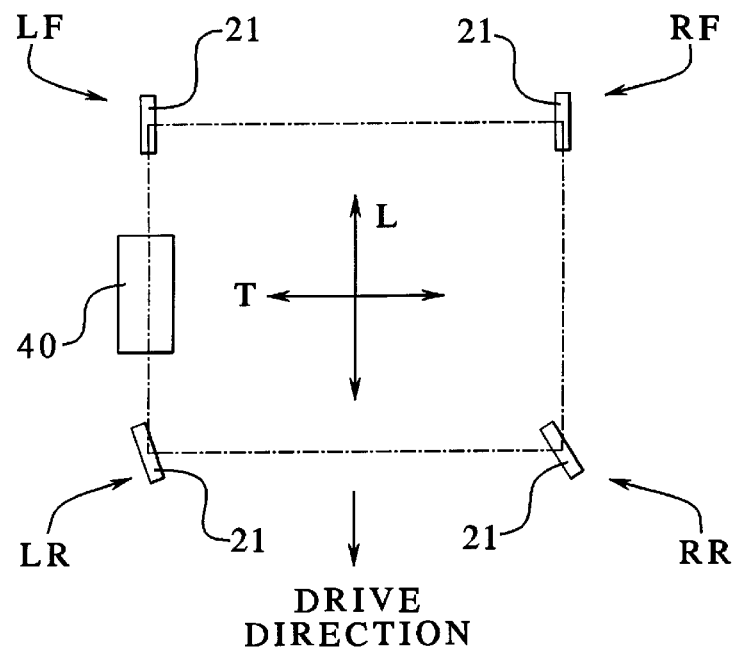
FIG. 5 is a schematic plan view of the wheels of the crane in a rearward longitudinal driving mode.
Figure 6:
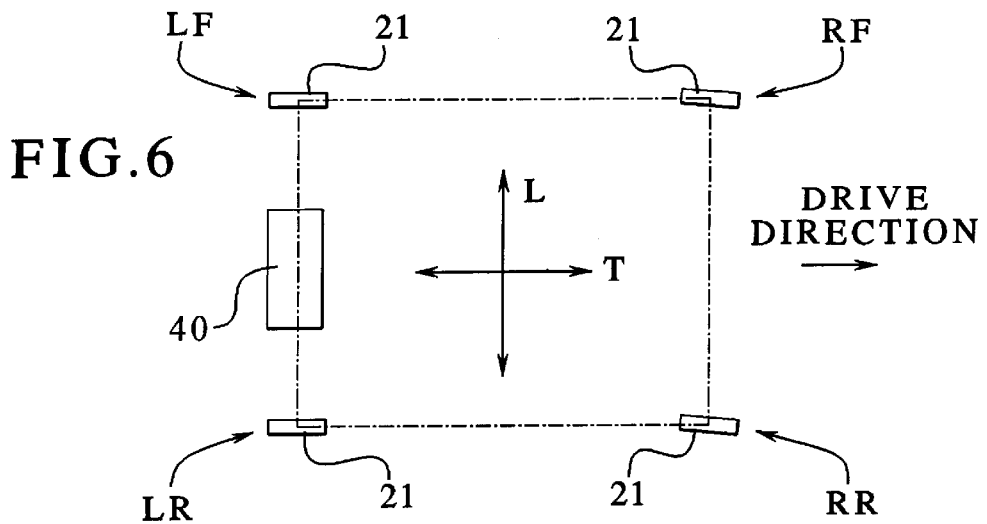
FIG. 6 is a schematic plan view of the wheels of the crane in a rightward transverse driving mode.
Figure 7:
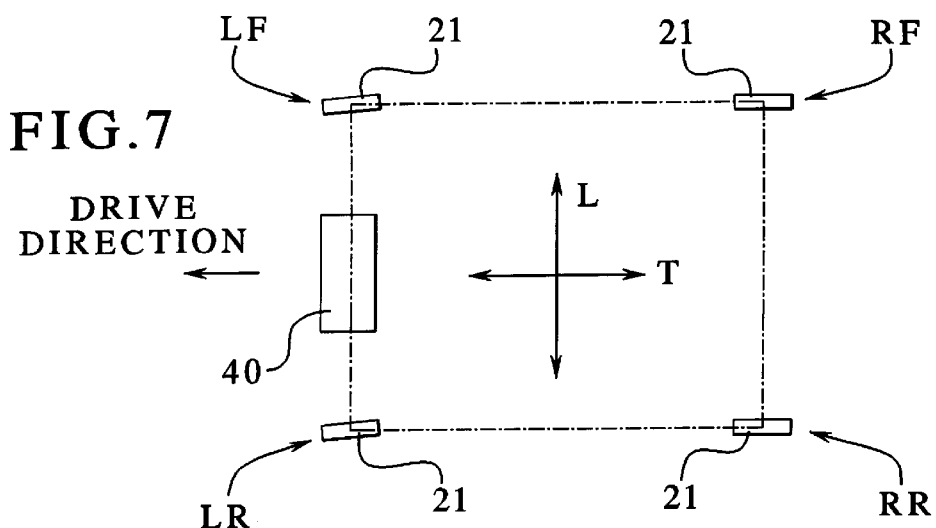
FIG. 7 is a schematic plan view of the wheels of the crane in a leftward transverse driving mode.

FIGS. 4 and 5 illustrate the crane 20 in the longitudinal travel mode. In the longitudinal mode, the crane is movable forwardly or rearwardly along the direction of the longitudinal axis L. Accordingly, each of the wheels 21 of the wheel assemblies RF, LF, RR, LR is generally aligned to roll generally parallel to the longitudinal axis. FIGS. 6 and 7, on the other hand, illustrate the crane 20 in a transverse travel mode. In the transverse mode, the crane is movable to the left or right along the direction of the transverse axis T. Accordingly, each of the wheels of the wheel assemblies RF, LF, RR, LR is aligned to roll generally parallel to the transverse axis T. In each of the steering scenarios illustrated in FIGS. 4–7, a respectively different pair of the wheels are "leading".

According to the invention, gentry crane has a the steering system which automatically switches steering control to the wheels of the "leading" pair of wheel assemblies, whether the crane is moving longitudinally frontwardly or rearwardly, or transversely right or left. The wheels of the opposite pair of wheel assemblies, i.e., the "trailing" wheel assemblies, are maintained in a straight orientation relative to the desired travel axis. More particularly, the system detects which pair of wheel assemblies are "leading" and sends steering control signals to the steer the wheels of that pair of wheel assemblies until the direction or mode (transverse or longitudinal) has been altered.

Referring to FIG. 4, the crane is in a forward longitudinal driving mode, in a forward driving direction. More particularly, the front wheels RF, LF are leading and the rear wheels RR, LR are trailing, and accordingly, the front wheels RF, LF are controlled to permit steering movement. Specifically, the wheel of the front wheel assemblies RF, LF are cooperatively pivotable to respective steering angles deviating from parallel alignment of the longitudinal axis L. The wheels of the trailing rear wheel assemblies RR, LR are moved to, and/or held at, a "straight" or zero degree orientation relative to the axis L to roll along the longitudinal axis L.

The operator may reverse the direction of the crane 20. When this occurs, the crane is in a rearward longitudinal driving mode, moving in a rearward driving direction, as indicated in FIG. 5. The wheels of the rear wheel assemblies RR, LR are then leading, and accordingly, steering control by the operator results in cooperative steering movement of the wheels of the rear wheel assemblies RR, LR relative to the longitudinal axis L. When the rearward driving mode of FIG. 5 is selected, the wheels 21 of the front wheel assemblies RF, LF are trailing. Accordingly, the front wheels RF, LF are moved to, and/or held at, a "straight" orientation which is zero degrees relative to the longitudinal axis L.

When the operator desires, the crane 20 may be switched to the transverse travel mode. When this occurs, all of the wheels 21 of the wheel assemblies RF, LF, RR, LR are pivoted to a 90° or perpendicular orientation relative to the longitudinal axis L, indicated by the transverse axis T. As illustrated in FIG. 6. the crane is in a rightward transverse mode, being driven in a driving direction toward the right, and thus, the wheels 21 of the right wheel assemblies RF, RR are leading and the wheels 21 of the left wheel assemblies LF, LR are trailing. Accordingly, the wheels 21 of the right wheel assemblies RF, RR are steerable, being cooperatively pivotable to respective steering angles deviating from parallel alignment of the transverse axis T. The wheels of the trailing left wheel assemblies LR, LF are moved to, and/or held at, a zero degree "straight" orientation relative to the transverse axis T.

As shown in FIG. 7, the crane 20 is in a leftward transverse mode, being driven in a driving direction toward the left. Accordingly, the wheels 21 of the left wheel assemblies LF, LR are leading and the wheels 21 of the right wheel assemblies RF, RR are trailing. The wheels 21 of the left wheel assemblies LF, LR are steerable, being cooperatively pivotable to respective steering angles deviating from parallel alignment of the transverse axis T while the wheels 21 of the trailing right wheel assemblies RF, RR are held at a zero degree "straight" orientation relative to the transverse axis T.

As illustrated, the actuators 42, 44, 46, 48 have mechanical limits determined by the stroke of each piston 52 and the linkage length. Therefore, the actuators 42, 44, 46, 48 are mounted to optimize the steerability of the crane 20 according to its desired usage and according to the steering angle range limits of the actuators 42, 44, 46, 48. For example, in many loading environments, the longitudinal modes of FIGS. 4 and 5 are the most frequently used modes for maneuvering the crane 20. A substantial amount of steering is typically desired in the longitudinal modes for executing primary travelling and maneuvering. Therefore, a substantial amount of the actuator range is dedicated to the steering range in the longitudinal modes, and the actuators 42, 44, 46, 48 are arranged to provide an inner turning angle Θ of 45°.

Transverse operation, on the other hand, is usually relatively linear, and does not typically demand high steering maneuverability. Rather, transverse operation typically needed for proper sideways positioning of the crane 20 after the crane has already driven longitudinally traveled to a particular spot. For example, it is sometimes desirable to drive the wheel assemblies RF, LF, RR, LR transversely between spaced stacks of containers, moving to properly position the grappler over a container to be lifted. A relatively small amount of steering control is typically suitable for such a transverse operation. As shown in FIGS. 6 and 7, the crane 20 permits transverse steering movement within a range β of 5° relative to the transverse axis T.

It should be understood that a crane 20 constructed in accordance with the invention may be configured so that the actuators 42, 44, 46, 48 could provide any desired range of steering angle motion depending on the particular positioning, geometry and/or type of actuators and linkages used. For example, the actuators could be a type with a pivoting range Φ equal to 360°, (such as an actuator having a rotational motor driving the yoke with gearing or a chain drive).

Figure 8:
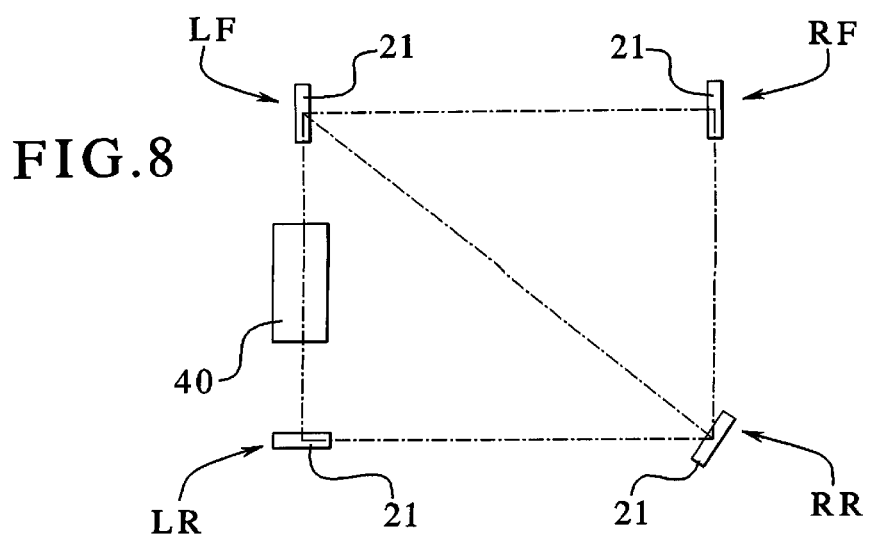
FIG. 8 is a schematic plan view of the wheels of the crane in an optional pivot steer mode.

The operator may select any of the steering modes illustrated in FIGS. 4–7. Optionally, the crane 20 may additionally be operated in a pivot mode, as illustrated in FIG. 8, which enables the entire crane 20 to be pivoted around a selected one of the wheel assemblies RF, LF, RR, LR. As illustrated, the wheels of the wheel assemblies RF, RR, and LR are pivoted so that their respective rotational axes intersect the wheel 21 of wheel assembly LF, thereby pivoting the crane about the position of wheel assembly LF.

Figure 9:
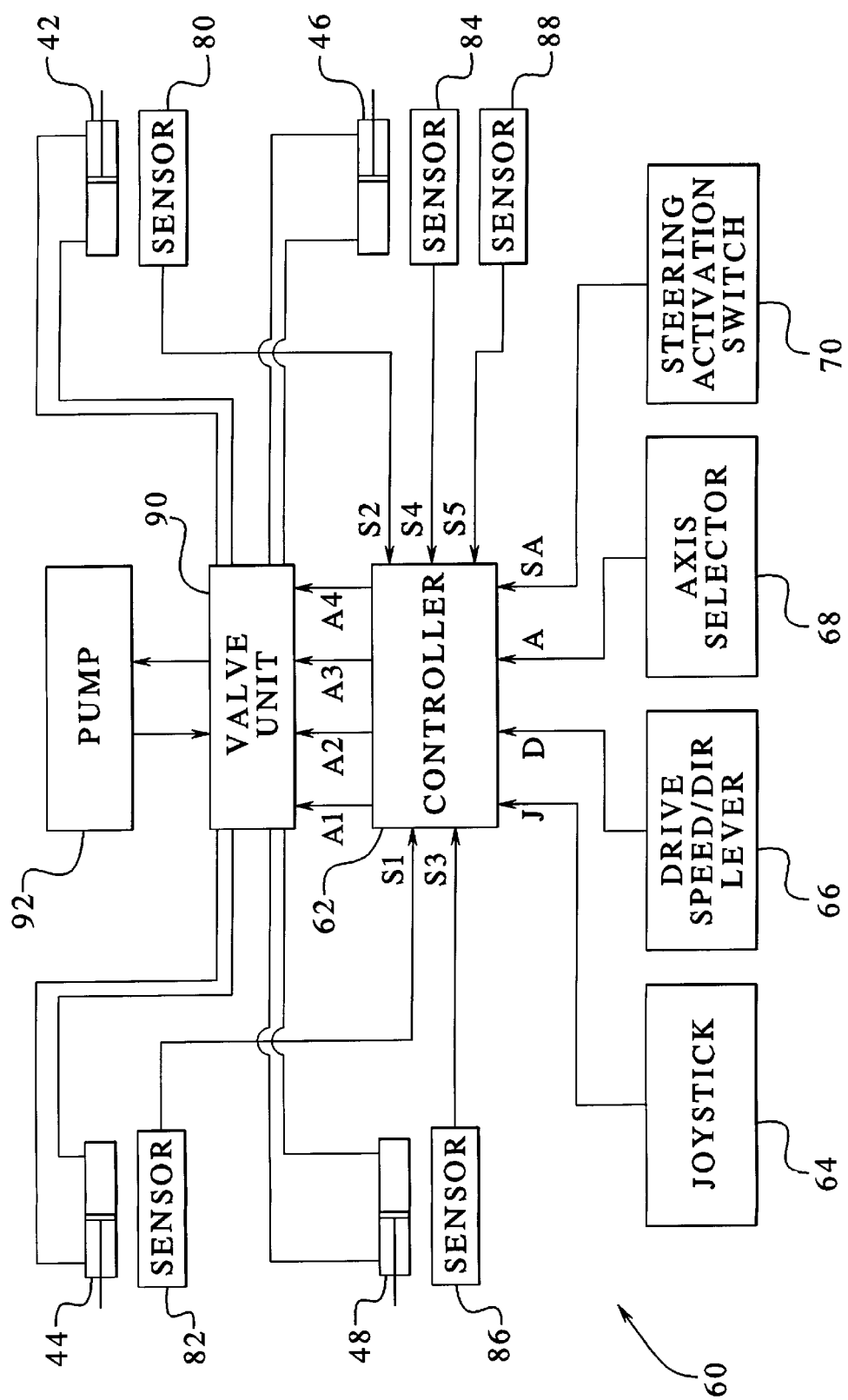
FIG. 9 is a schematic view of a steering control circuit for controlling the steering direction of the wheels.

FIG. 9 schematically illustrates a steering system 60 according to the invention for accomplishing the desired steering control modes of FIGS. 4–7. The steering system 60 includes a controller 62. A crane operator can provide input to the controller 62 by various input devices located in the cab 38, (FIG. 1) including a steering joystick 64, a drive speed/direction lever 66, an axis selector switch 68 (to select between longitudinal and transverse modes) and a steer actuator switch 70. Various indicator lights or instruments may also be provided which are viewable by the operator to indicate one or more conditions. Additionally, each yoke 30, 32, 34, 36 is provided with a respective rotary encoder or steering angle sensor 80, 82, 84, 86 which sense an actual angle of the respective yoke 30, 32, 34, 36 relative to the frame 22 (FIG. 1). The joystick 64 sends a signal J to the controller 62, the lever 66 sends a signal D to the controller 62, the axis selector switch 68 sends a signal A to the controller 62, and the activation switch 70 sends a signal SA to the controller 62. The sensors 80, 82, 84, 86 respectively send corresponding feedback signals S1, S2, S3, S4 to the controller 62. Additionally, a speed sensor 88 senses a rate of rotation of at least one of the wheel 21 of the wheel assemblies RF, LF, RR and/or LR and delivers a corresponding signal to the controller 62 as well.

Preferably, the sensors 80, 82, 84, 86 provide a 0–10 volt dc signals S1, S2, S3, S4, respectively, which proportionally vary over a 180° span of movement. The signals S1, S2, S3, S4 respectively increase toward 10 volts dc as the corresponding yokes 30, 32, 34, 46 (FIGS. 1, 3) pivot in a counterclockwise direction. The sensors 80, 82, 84, 86 are powered by a 24 volt dc power source may be protected by a MOV.

From the input signals J, D, A and SA, as well the feedback signals S1, S2, S3, S4 from the angular sensors 80, 82, 84, 86, the controller 62 determines appropriate actuation signals A1, A2, A3, A4 are delivered to the hydraulic valve unit 90 connected with the hydraulic lines supplied by hydraulic pump 92. The valve unit 90 provides hydraulic flow to the actuators 42, 44, 46, 48 as needed to pivot the yokes 30, 32, 34, 36 to desired steering axis positions according to FIGS. 4–7, to cause the desired steering movement of the lead wheels, and to cause appropriate driving rotation of the driving wheels RR, LR. Preferably, the pump 92 is a variable displacement pump, such as a pump marketed as the Rexroth 125 pump available from Rexroth Corp., 2315 City Line Rd, Bethlehem, Pa. 18017. The scope of the invention is not limited to a specific type of pump or steering actuator. Other types of steering actuators may be used including: rotary actuators, hydraulic motors, electric actuators or motors, or actuators or motors operating on any appropriate power source, so long as the actuator or motor is suitable to accomriplish the required wheel-pivoting steering movement described.

The controller 62 controls the positions of the hydraulic actuators 42, 44, 46 48 located at the yokes 30, 32, 34, 36 depending on steering input from the operator and according to programmed control operation as described below. The drive speed/direction lever 66 is sequentially positionable from a variable forward position, a neutral position, and a variable reverse position. The controller 62 determines which two of the wheel assemblies RF, LF, RR, LR are "leading" from the most current signal from the drive speed/direction lever 66 and the then-selected steering orientation (on axis L or T). When the operator manipulates the steering joystick 64, the controller 62 appropriately actuates the corresponding steering actuators of the particular "leading" wheels corresponding to the signal from the joystick 64. When the drive speed/direction lever 66 is moved, the controller 62 causes the drive pump 92 to deliver flow to the drive motors 58 to accelerate the drive wheels of the wheel assemblies RR, LR. The flow rate of the pump 92 is increased until a speed sensed by the speed sensor 88 corresponds to the signal of the lever 66 has been achieved. The crane 20 is accordingly accelerated and decelerated to maintain a speed set by the position of the drive speed/ direction lever 66. The crane 20 is stopped to a rest when the lever 66 is moved to its neutral position. After a delay time equal to a brake release cycle, wheel brakes are deployed unless the lever 66 is moved in the meanwhile from its neutral position.

During operation of the crane 20 according to one of the modes illustrated in FIGS. 4–7, the operator controls steering movement of the leading pair of wheels by moving the steering joystick 64. Based on the input from the steering joystick, the controller 62 determines correspondingly appropriate steering angles for the respectively steered pair of yokes 30, 32, 34, 36. The steering angles are not the same for each lead-wheel yoke, but rather, those yokes are cooperatively steered so that the rotational axes of all of all of the respective wheels converge at a common distal point P, as illustrated, for example, in FIG. 4. Maintaining such a steering-angle variation minimizes tire friction and stress on the frame 22. The distance of the point P relative to the crane varies with the degree of steering.

The operator may choose to reverse the crane drive direction while the wheels 21 remain in generally the same longitudinal or transverse alignment. For example, the crane 20 may be changed between forward (FIG. 4) and reverse (FIG. 5) modes along axis L or changed between rightward (FIG. 6) and leftward (FIG. 7) modes. The controller does not alter its determination of the "leading" pair of wheel assemblies if the operator merely moves the drive speed/direction lever 68 to neutral. However, the controller 62 determines that a different pair of wheels are "leading" when the drive speed/direction lever 66 is moved from one of the drive positions, through the neutral position, to an opposite position (e.g., forward to reverse). When this occurs, if the crane 20 is moving, the controller 62 causes the drive wheels of the wheel assemblies RR, LR to decelerate to zero speed, stopping the crane 20 to a rest. The controller 62 then sends appropriate signals A1, A2, A3, A4 to actuate the trailing (previously-leading) wheels to move to a straight orientation relative to the selected axis L or T. Acceleration in the currently-selected direction is then permitted, with steering movement being directed to the then-leading wheels in response to the signal J from the steering joystick 64.

The operator may selectively switch between longitudinal and transverse modes with the axis selector switch, causing the controller 62 to move the wheels into appropriate alignment on corresponding axis L or T. A "wheels ready" light may be activated when the wheels are not in transition between travel axes and when the no driving movement is occurring. In particular, the "wheels ready" light is activated when the sensors 80, 82, 84, 86 are delivering constant signals S1, S2, S3 and S4 corresponding to a particular axis (L or T) orientation and when the drive lever 66 is neutral, having a signal of 0 volts. The operator verifies that the drive selection lever 66 and steering joystick 64 are in their neutral positions. Then, the operator may move the axis selector switch 68 to either a "0 degrees" (axis L) position or a "90 degrees" (axis T) position, as desired. The operator may then actuate the steer actuator switch 70, causing the controller 62 to deliver appropriate signals A1, A2, A3, A4 to actuate the steering actuators 42, 44, 46, 48 to align the wheels of the wheel assemblies RF, LF, RR, LR, respectively, to a neutral position (0 degrees) relative to the particular operating axis L or T.

During transitional movement of the wheels 21 of the wheel assemblies RF, LF, RR, LR, the "wheels ready" light indicates that the wheels are not "ready" (either by flashing, or by being off) but the "wheel ready" light is continuously illuminated when all of the wheels of the wheel assemblies RF, LF, RR, LR have reached the selected orientation. The controller 62 then permits maneuvering by responding to input from the drive speed/direction lever 66 and/or steering joystick 64.

If the axis selection switch 68 is moved while the crane 20 is moving, the controller 62 decelerates the drive wheels of the wheel assemblies RR, LR until the crane 20 halts before permitting the above-described axis transition.

The controller 62 may also include a selective override of the lead-wheel steering operation when desired to permit particular maneuvering abilities. Also, the lead wheel steering operation may be automatically overridden during optionally selected steering modes, such as pivot steering (FIG. 8).

Figure 10:
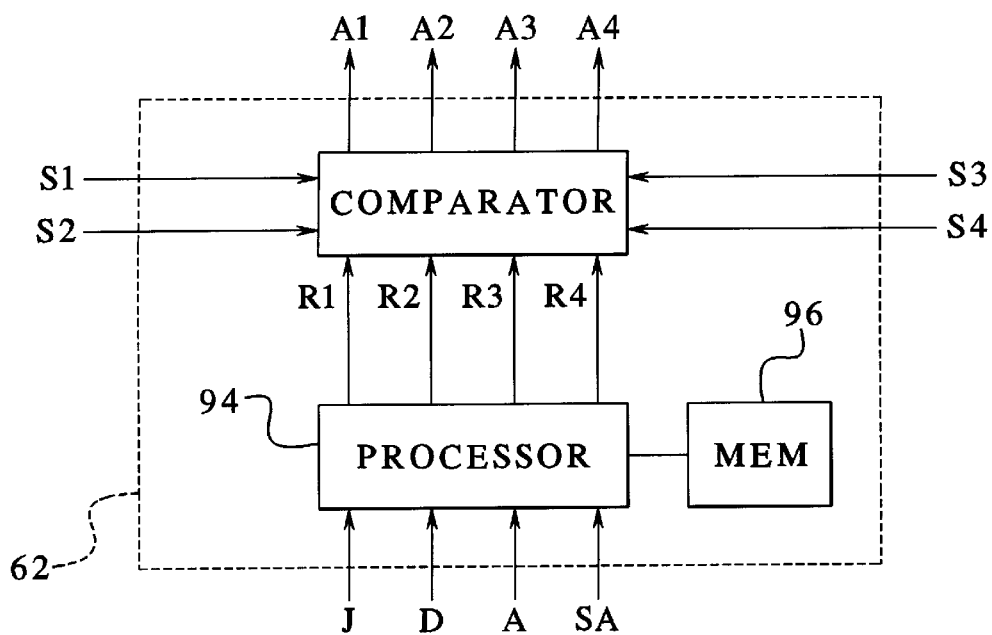
FIG. 10 is a schematic view of an exemplary controller embodiment.

FIG. 10 illustrates an exemplary embodiment of the controller 62 in greater detail. The controller 62 preferably contains a processor 94 connected to receive the input signals J, D, S, SA. The processor 94 determines which pair of the wheel assemblies RF, LF, RR, LR are leading from the positions of the axis selector lever 68 together with the position of the drive speed/direction lever 66. Accordingly, from the control inputs J, D, S, SA the processor 94 determines a plurality of reference signals R1, R2, R3, R4 indicating the desired steering angles of the wheels 21 of the wheel assemblies RF, LF, RR, LR to provide proper yoke axis and steering angles for the lead-wheel operation of FIGS. 4–7. To determine the reference signals R1, R2, R3, R4, the processor may apply an algorithm or lookup table stored in a memory 96. For example, to cooperatively steer the leading wheels such that the rotational axes of all of the wheels of the wheel assemblies RF, LF, RR, and LR converge at the common point P (FIG. 4), the controller 62 determines the appropriate difference in angles between the steered wheels by applying an appropriate algorithm to the steering input signal J or by applying an appropriate lookup table of cooperative steering angle values stored in the memory 96. The processor 94 also determines a direction of desired wheel rotation.

Figure 11:
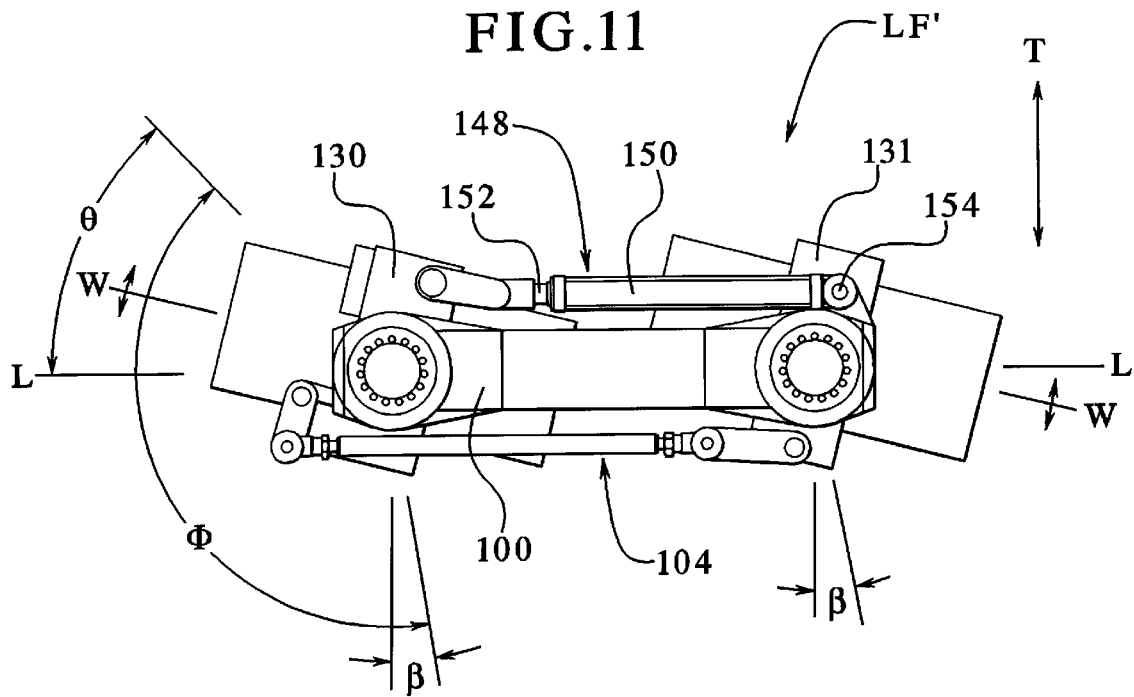
FIG. 11 is a plan view of a wheel assembly supporting a corner of the crane according to an embodiment of the invention wherein the wheel assembly includes multiple steerable wheels.

In accordance with the invention as described above in connection with FIGS. 1–10, some or all of the wheel assemblies RF, LF, RR, LR may be provided with multiple wheels, as demonstrated, for example, by the exemplary wheel assembly RF' illustrated in FIGS. 11 and 12. The wheel assembly RF' has multiple wheels 21.

As shown in FIG. 11, the wheel assembly RF is mounted to support a corner of a crane, such as the crane 20 shown in FIG. 1. More specifically, the wheel assembly RF' includes a truck 100 which is mounted to a column 24. A pair of steerably pivotable yokes 130, 131 are mounted to the truck 100, a wheel 21 is rotatably mounted in each of the respective yokes 130, 131.

The wheel assembly RF' includes a hydraulic actuator 148 includes a cylinder 150 and an extendible piston rod 152. An end of the cylinder 150 is pivotally mounted to the truck 100 at a joint 154, and an end of the piston rod 152 is pivotally mounted to yoke 130. Extension or retraction of the piston rod 152 is thereby operable to pivotally steer the yoke 130. The yokes 130, 131 are positively coupled by a linkage 104, so that the actuator also causes the yoke 131 to steer simultaneously. The geometry of the linkage is selected so that the wheels 21 of the wheel assembly RF' approximate a cooperative steering motion such that the rotational axes of both wheels converge at a common distal point with the other wheels of the crane, in the manner explained above in connection with FIG. 4.

Like the yokes 30, 32, 34, 36 of the wheel assemblies RF, LF, RR, and LR, the yokes 130, 131 of the wheel assembly RF' of FIG. 11 are operable to steer both of the wheels 21 selectively along either the longitudinal axis L or transverse axis T. Moreover, the actuator 148 and linkage 104 are designed to provide steering motion of to both of the wheels 21 in an appropriate range of motion Φ, including the steering angles Θ and β, in a manner as described in connection with FIGS. 1–10.

Other wheel assembly configurations having multiple wheels are also possible. For example, in an embodiment, dual wheels may be mounted side-by-side in a common steerable yoke. Any wheelset configuration which includes multiple correspondingly-steered wheels operates in the manner of a "wheel" as described in connection with FIGS. 1–10, and accordingly, such "wheelsets" are within the scope of the invention.

Although the invention is described herein in connection with certain preferred embodiments, it is recognized that various changes and modifications to the invention will be apparent to those skilled in the art. Such changes and modifications may be made without departing from the spirit and scope of the invention. Accordingly, the appended claims are intended to cover all such changes and modifications.

What is claimed is:

1. A steering system for a gantry crane having at least four wheel assemblies arranged in a quadrilateral pattern, each said wheel assembly includes at least one wheel, the wheels being cooperatively pivotable such that said crane is selectively operable along either a longitudinal axis or a perpendicular transverse axis, the steering system comprising:
   a plurality of steering actuators coupled to respectively pivot the wheels; and
   a controller operating said steering actuators to steer the respective wheels, the controller receiving at least one signal that identifies a selected one of the axes and a selected drive direction along the selected axis, the controller operable to determine from the at least one signal a leading pair of the wheels relative to the selected drive direction, the controller operating the actuators to steer the determined leading pair of wheels in response to a steering input.

2. A steering system according to claim 1, wherein the controller operates the actuators to hold a trailing pair of wheels opposite said leading pair of wheels in alignment parallel to said selected axis.

3. A steering system according to claim 1, wherein the controller determines which pair of wheels is leading when the selected axis or drive direction along the selected axis is selected.

4. A steering system according to claim 1, further comprising an axis selector switch and a drive speed/direction lever, said at least one signal including a signal provided by the axis selector switch corresponding to one of said axes and a signal provided by the drive speed/direction lever corresponding to a desired drive direction along the selected axis for determining which pair of said wheels are leading.

5. A steering system according to claim 1, wherein at least one of said wheel assemblies includes a plurality of wheels which are coupled for cooperative steering relative to each other.

6. A gantry crane having:
   a frame;
   a right front wheel assembly, a left front wheel assembly, a right rear wheel assembly and a left rear wheel assembly, each of the wheel assemblies includes at least one wheel pivotally mounted to the frame so that the crane is selectively drivable in a either a forward mode or rearward mode along a longitudinal axis or in a leftward mode or a rightward mode along a transverse axis perpendicular to said longitudinal axis; and
   a controller receiving at least one signal identifying a selected one of said modes, the controller providing steering control in response to a steering input such that the wheels of the two front wheel assemblies are steerable when the forward mode is selected, the wheels of the rear two wheel assemblies are steerable when the rearward mode is selected, the wheel of the left two wheel assemblies are steerable when the leftward mode is selected, and the wheels of the right two wheel assemblies are steerable when the rightward mode is selected.

7. The crane according to claim 6, wherein the wheel of the wheel assemblies opposite the steerable wheels are held in fixed alignment relative to the selected axis.

8. A method for steering a gantry crane, the gantry crane having a rigid frame, a right front wheel assembly, a left front wheel assembly, a right rear wheel assembly and a left rear wheel assembly, mounted to the frame in a generally quadrilateral manner, each of the wheel assemblies includes one or more wheels, each of the wheels being pivotable for alignment to roll in a selected forward or rearward direction along a longitudinal axis or in a rightward or leftward direction along a transverse axis perpendicular to the longitudinal axis, the method comprising the steps of:
   providing at least one signal that identifies a selected one of the axes and a selected one of the directions alone the selected axis,
   detecting from the signal which two of the wheel assemblies are leading relative to the selected drive direction;
   steering the wheels of the leading pair of wheel assemblies in response to a steering input.

9. A method according to claim 8, further comprising:
   holding the wheels of the pair of wheel assemblies opposite the leading pair of wheel assemblies in a rollable alignment parallel to the selected axis.

10. A method according to claim 8, wherein said detecting step includes:
   sensing whether the wheels are aligned on the longitudinal or transverse axis; and
   sensing a drive direction motion along one of said axes.

* * * * *